US007564408B2

(12) United States Patent
Glöckler et al.

(10) Patent No.: US 7,564,408 B2
(45) Date of Patent: Jul. 21, 2009

(54) SENSOR NETWORK AND METHOD FOR MONITORING A TERRAIN

(75) Inventors: Roman Glöckler, Lauf (DE); Peter Kalisch, Nürnberg (DE); Gerd Eβer, Kleinmachnow (DE)

(73) Assignee: Diehl Stiftung & Co. KG, Núrnberg (DE)

( * ) Notice: Subject to any disclaimer, the term of this patent is extended or adjusted under 35 U.S.C. 154(b) by 296 days.

(21) Appl. No.: 11/542,558

(22) Filed: Oct. 3, 2006

(65) Prior Publication Data

US 2007/0080863 A1 Apr. 12, 2007

(30) Foreign Application Priority Data

Oct. 8, 2005 (DE) ...................... 10 2005 048 269

(51) Int. Cl.
*G01S 3/02* (2006.01)

(52) U.S. Cl. ...................................................... 342/463

(58) Field of Classification Search ......... 342/463–465; 709/218, 232, 238–253

See application file for complete search history.

(56) References Cited

U.S. PATENT DOCUMENTS 6,735,630 B1 * 5/2004 Gelvin et al. ............... 709/224
2004/0233855 A1 11/2004 Gutierrez et al.
2006/0105785 A1 5/2006 Gfeller et al.

FOREIGN PATENT DOCUMENTS

DE 42 28 539 A1 8/1992
WO WO 01/26068 A1 4/2001
WO WO 2005/088260 A1 9/2005

OTHER PUBLICATIONS

I.F. Akyildiz et al., Wireless sensor networks: a survey, Computer Network, vol. 38, p. 393-422, 2002.*

D. Niculescu et al., Ad hoc positioning system (APS) using AOA, Twenty-Second Annual Joint Conference of the IEEE Computer and Communications Societies, vol. 3, p. 1734-1743, Apr. 2003.*

(Continued)

*Primary Examiner*—Thomas H Tarcza
*Assistant Examiner*—Fred H Mull
(74) *Attorney, Agent, or Firm*—Scully, Scott, Murphy & Presser, P.C.

(57) ABSTRACT

A sensor network (1) as well as a method for monitoring a terrain (6) is specified. The sensor network (1) has a number of fixed-position sensors (3, 3', 3''), which can be deployed in the terrain (6), and at least one programming module (25), with the fixed-position sensors (3, 3', 3'') each being equipped with a communication device, with the at least one programming module having a position-finding device and a programming device (25), in which case the position of the sensors (3, 3', 3'') can be determined by the position-finding device and can in each case be applied to the sensors (3, 3', 3'') by the programming device (25) via the communication device, and with the sensors (3, 3', 3'') being designed such that they themselves form a network. The sensor network (1) as well as the method, which is carried out in a manner corresponding to it, for monitoring the terrain (6) require sensors (3, 3', 3'') of simple design, and are thus associated with a cost advantage.

21 Claims, 1 Drawing Sheet

OTHER PUBLICATIONS

K.K. Chintalapudi et al., Ad-hoc localization using ranging and sectoring, Twenty-Third Annual Joint Conference of the IEEE Computer and Communications Societies, vo. 4, p. 2662-2672, Mar. 2004.*

D. Carter et al., Automated geolocation network for use in GPS-degraded environments, Position Location and Navigation Symposium, p. 690-697, Apr. 2004.*

M. Barbeau, Improving Distance Based Geographic Location Techniques in Sensor Networks, Proceedings of the Third International Conference on Ad-Hoc, Mobile and Wireless Networks, in Lecture Notes in Computer Science, vol. 3158, p. 197-210, 2004.*

Savvides, et al., "Dynamic Fine-Grained Localization in Ad-Hoc Networks of Sensors" pp. 166-179; 2001.

* cited by examiner

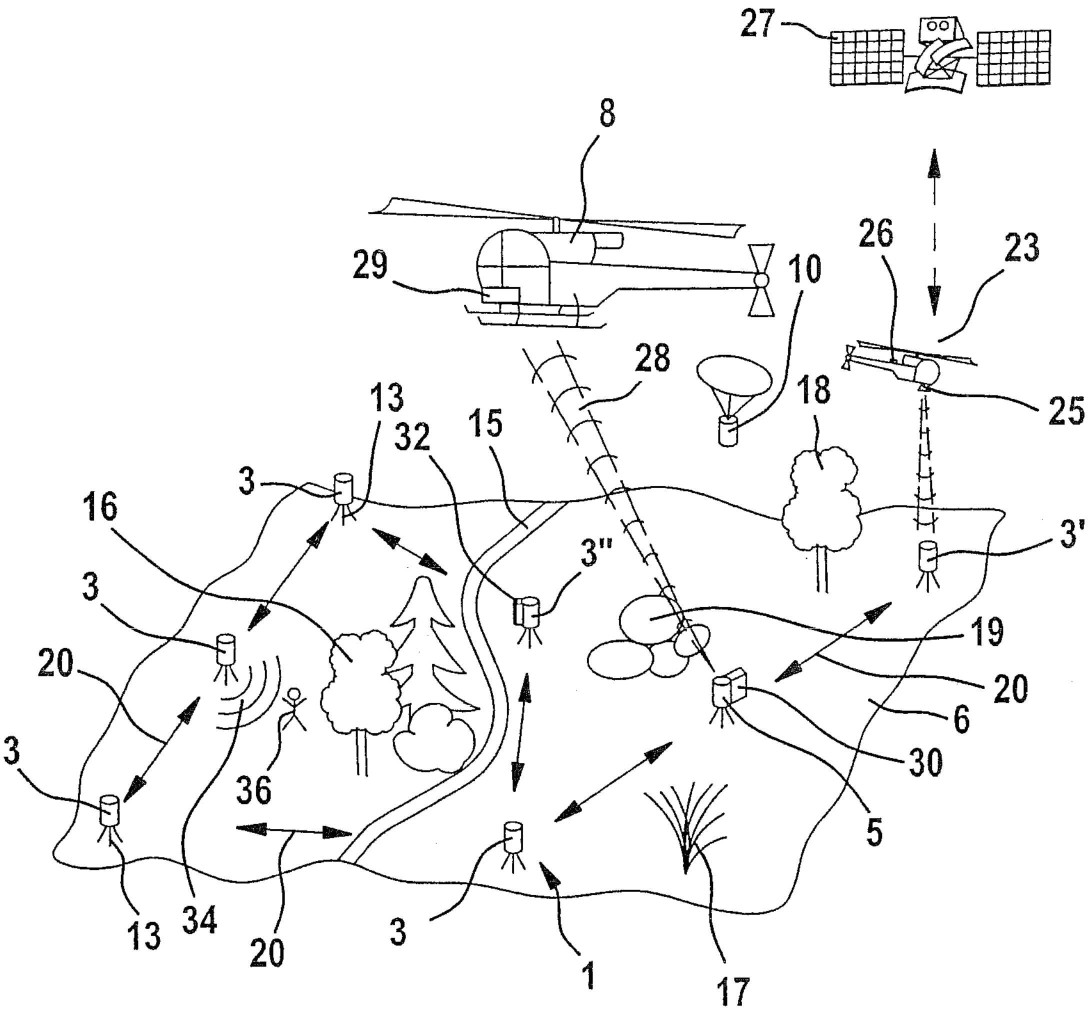
27
8
29
10
26
23
28
18
25
13
32
15
3
16
3"
3'
3
19
20
20
6
3
30
36
5
13
34
20
3
1
17

SENSOR NETWORK AND METHOD FOR MONITORING A TERRAIN

BACKGROUND OF THE INVENTION

1. Field of the Invention

The invention relates to a sensor network and to a method for monitoring a terrain. The invention relates in particular to the problem of protecting a terrain against undesirable persons entering it or of monitoring activities of any type within the terrain.

2. Discussion of the Prior Art

For civil monitoring of a terrain, it is known for optical sensors such as cameras or motion sensors to be provided, which record activities and/or movements on or within the terrain, or initiate follow-up actions such as switching on illumination. In the military field, for example, a depot must be protected and monitored, or else it is necessary to ensure that an entire area of terrain cannot be crossed over. Once again, optical sensors or detectors of any type are used for the first situation. Land mines, which are still forbidden, are used for the second situation and have to be removed again later in a manner which is dangerous and time-consuming, in order to make the terrain usable again.

SUMMARY OF THE INVENTION

Accordingly, an object of the invention is to specify a sensor network which allows a terrain to be monitored and protected with as little effort as possible and cost-effectively. A further object of the invention is to specify a corresponding method for monitoring and protection of a terrain, with the corresponding advantages.

According to the invention, the first-mentioned object is achieved by a sensor network having a number of fixed-position sensors, which can be deployed in a terrain, for monitoring-relevant parameters, and having at least one programming module, with the fixed-position sensors each being equipped with a communication means for communication with one another and with the programming module, with the programming module having a position-finding means and a programming means, in which case the position of the sensors can be determined by means of the position-finding means and can in each case be applied to the sensors by the programming means via the communication means, and with the sensors being designed such that they themselves form a network.

A first step of the invention is in this case based on the knowledge that, in order to monitor in particular a large area of terrain, the precise location or the precise position of an activity, such as the movements of a person entering this area, must be identified in order that follow-up steps can be taken for further surveillance or in order to take an appropriate countermeasure such as apprehension of the detected person.

In a further step, the invention identifies the fact that, in particular, monitoring of a large terrain area involves immense effort in installation of individual sensors accurately in position. The sensors, which are installed in fixed positions, must be interconnected, and connected to a central control unit, and this is complex. The central control unit can then use the nature of the interconnection or some other coding to determine which signals are being received from which location in the terrain. One such system, for example, is the installation of a plurality of cameras at different locations on a building. An installation which is as complex as this and is associated with a major time penalty can, however, be avoided by providing at least one programming module for the fixed-position sensors, whose position-finding means can be used to determine the position of the sensors. Once the position has been determined, it is then applied to the respective sensor by programming. The sensor then knows the position at which it is located, and this allows the sensors to be deployed freely; the position is allocated after deployment.

The provision of a programming module such as this also offers the capability to use small quantities of relatively expensive components, such as the position-finding components, while other, cheaper components can be arranged in large quantities in the sensors. A cost-effective overall system is created by advantageous series production of the sensors associated with a reduction to a small number of expensive components.

Furthermore and finally, the invention has identified that the complex checking of each individual sensor on the basis of the recorded parameters can be simplified considerably by equipping the sensors with communication means in order to communicate with one another. This is because, in this case, the recorded information can be reported easily in the form of signals, for example to the sensors which are arranged adjacent and themselves pass on the information. A sensor network such as this avoids, in particular, parallel communication paths. There is also no need to provide a respective cable link from each individual sensor to a central control unit. In this case, the sensors are networked with one another autonomously, for example by determining the strongest communication signal or the communication signal with the best signal-to-noise ratio from the signals received from the surrounding sensors, and then setting up an appropriate communication link. Depending on the nature of the chosen communication coupling parameters, a sensor network is then created, with efficient communication paths between the sensor and to the central control unit.

The described sensor network is suitable not only for civil but also for military applications. The sensors, which can be deployed at random, do not have their position applied to them until after deployment. An advantageous, in particular, rapid, procedure for passing on the detected signals to a central control unit is set up via communication paths which form themselves. The sensors are not restricted to the detection of persons entering the area. It is equally possible to detect monitoring-relevant parameters such as hazardous substance concentrations, smoke, fog, vibration or biological/chemical warfare agents. In particular, there is no need either in this case for all of the sensors to be equipped with the same detectors. It is in fact feasible to monitor different parameters which are relevant for monitoring within the terrain, by means of different sensors.

The sensors, which may be deployed or spread out, can thus have their position applied to them by a local operator manually programming each sensor. It is also feasible to use application by means of radio communication or optical communication from a central programming module, which knows the position of the individual sensors. However, if the position coordinates of the sensors are initially unknown after deployment (for example once the sensors have been ejected from an aircraft), it is thus advantageous for the programming module to be mobile. In this case, the programming module can approach the sensors, determine their actual position, and transmit this position by the programming means to the sensor being approached. The remaining "position uncertainty", which corresponds to the distance between the approached programming module and the respective sensor is negligible, but can also be taken into account if required.

It is expedient for the position-finding means to be a navigation element, in particular a GPS or a Galileo detector, in order to detect the programming module's own position. This allows the global position of the programming module, and thus the position of the sensors "being approached" to be determined reliably. Other navigation elements can also be used for the position-finding means, such as, in particular, radio direction finding or localization of a mobile telephone by means of a fix by the node that is dialled.

In one alternative refinement of the invention, the position-finding means comprises a triangulation appliance, which uses reference sensors to determine the position of the sensors. In this case, by way of example, the reference sensors are themselves equipped with a navigation element of the described type thus once again allowing its global position to be determined exactly. It is then possible by presetting fixed reference points (positions of the reference sensors) to determine the "finely-granulated" position of the individual sensors in the area with the aid of geometric triangulation methods. For example, a sensor whose position is unknown in the network for this purpose sends an identification signal, which is received by three reference modules whose positions are known. In the case of radio communication, the distance to the sensor element can then be deduced from the field strength information. Particularly in open terrain, this allows reliable position finding. The intersection of the range circles around the reference modules then corresponds to the sought position of the corresponding sensor.

Alternatively, the area occupied by each sensor can actually be taken into account even during deployment of the sensors. If the sensors are deployed such that they are distributed uniformly on the ground, as is invariably realistic with a large number of sensors, then a mean distance between the individual sensors can be stated just on this basis. A relatively fine geometric network is obtained by networking of the sensors to one another to form the sensor network in which, by way of example, the respectively strongest neighbours are in contact with one another. The sensors which are deployed at the comer points of the terrain can be identified by the fact that they can set up considerably fewer communication links to the adjacent sensors than those sensors which are arranged in the interior of the terrain. If the positions of some of the comer sensors are detected with the aid of the reference sensors, then the position of the individual sensors can be determined from there in turn with the aid of a triangulation method and the known mean distance into the interior of the sensor network.

In the case of a mobile programming module, the way in which it approaches the individual sensors is intrinsically irrelevant to the invention. However, in particular for military use of the sensor network, it is advantageous for the mobile programming module to be a component of a self-navigating drone. The drone which, for example, is in the form of a land robot or an unmanned flying object, then navigates autonomously through or over the terrain with the sensors deployed on it. The individual sensors can be located in the terrain by communication, with their position being determined and applied to them during this process. The use of an unmanned drone avoids the need, for example, for ground troops to have to carry out a dangerous operation in unknown terrain.

At least one master module is expediently provided in the sensor network which master module is equipped with a communication unit, and is in the form of an interface between the sensors and an external central control unit. Master modules such as these are deployed in considerably smaller quantities than the sensors as such. For its operation as an interface, a master module is provided with a device which, in particular, is able to set up a long-range communication link with a remotely located base depot or a remote central control unit.

The sensors advantageously have a communication detector for determination of a parameter which represents the communication strength. By way of example, this may be the level of the received signal, or the signal-to-noise ratio. The presetting of these parameters, which are used to set up the communication link with the adjacent sensors, defines, so to speak, the "networking" of the sensor network. For example, the communication detector can be provided by an electronic evaluation circuit.

Although the sensor network can be provided by means of electrical cable connections, particularly in the case of a civil application, it is expedient for the sensors to communicate without the use of wires. For this purpose, the communication means are formed in particular by transmitting and receiving units which communicate optically or by radio. The networking of the sensors to form the sensor network is then carried out in particular by selection of those adjacent sensors which have the best reception and transmission conditions by virtue of the local circumstances.

For monitoring and protection of a large-area terrain, it is expedient to design the sensors such that they can be ejected. The sensors are then deployed quickly and easily by ejecting them from an aircraft overflying the terrain. In this case, by way of example, the sensors drop onto the terrain, braked by a parachute, and remain there in a fixed position.

In order to prevent the positions of the deployed sensors from changing, for example on smooth, rocky or loose ground, the sensors can expediently be designed such that they anchor themselves in a fixed position. This can be achieved, for example, by screwing in a ground anchor or by adhesive bonding, in particular to rocky ground. In the same way, the shape of the sensors may also be designed such that they automatically bury themselves in the ground on impact, as a result of the accumulation of kinetic energy.

The invention offers the advantage that a sensor network can be formed by sensors of simple design and, particularly when used over a large area, has a significant cost advantage over directly coupled sensor/actuator systems.

Furthermore, direct tracking of objects is possible, in particular such as a person entering the area, within the sensor network. Accurate position information about the object is available at all times. The moving object leaves a track along the sensors which it passes.

Furthermore, particularly in the case of detection of hazardous substances or biological and chemical warfare agents, in addition to a statement about the local occurrence of a threat, the processing of a plurality of sensor data items also makes it possible to obtain further information, for example about the propagation behaviour of the threats as a result of air flows.

According to the invention, the object relating to a method is achieved by a method for monitoring a terrain, with a number of sensors being deployed in fixed positions in the terrain and with at least one programming module being used, with the sensors themselves forming a sensor network by communication, with the programming module determining the position of the sensors and applying this to them, and with the sensor network monitoring parameters which are relevant for monitoring and associated with the local position, by means of the sensors.

Further advantageous refinements are specified in the dependent claims relating to a method. Advantages relating to this can be found in the above statements relating to the sensor network.

By way of example, the invention is suitable for blocking access to, monitoring or securing large areas of terrain. One such typical terrain has an area of about 1 $km^2$, over which about 10 000 sensors are deployed. The mean distance between adjacent sensors is in this case about 10 m. In addition to the 10 000 sensors, about 10 master modules are deployed, which are able to make radio contact with a central control unit that is more than 10 km away.

BRIEF DESCRIPTION OF THE DRAWINGS

One exemplary embodiment of the invention is explained in more detail in a drawing. In this case, the single FIGURE uses a schematic overview illustration to show: a sensor network which is composed of sensors which can be ejected and is deployed in a terrain.

DETAILED DESCRIPTION OF THE INVENTION

The FIGURE shows, schematically, a sensor network 1 which forms its own network and is composed of individual sensors 3, 3', 3" as well as an associated master module 5. The individual sensors 3, 3', 3" as well as the master module 5 are deployed over a terrain 6 by ejecting them from a helicopter 8 overflying the terrain 6. In this case, as can be seen from the sensor 10 that has just been ejected, a parachute is deployed during the flight phase, for safe descent. When the sensors 3 arrive on the ground, they anchor themselves in a fixed position by means of an anchor 13, which is not illustrated in any more detail here.

The illustrated terrain 6 to be monitored and secured can be overlooked relatively easily and has a track 15 passing through it, a group of trees 16, grass growth 17, a tree 18 standing on its own as well as a rocky hill 19. In total, just six sensors 3, 3', 3" as well as one master module 5 are deployed, with the sensor 10 actually still being in the flight phase.

The sensors 3, 3', 3" which have reached the ground have already formed a network with their neighbours, with the respective communication link 20 in each case being formed by choosing that neighbour with which it has been possible to achieve the strongest communication link. All of the sensors 3, 3', 3", 10 and the master module 5 each have a transmitting and a receiving unit as the communication means, for a radio link at a predetermined radio frequency. The communication links 20 have been set up by choice of those neighbours whose transmission signal it has been possible to receive with the highest field strength. For example, the sensor 3 which is arranged centrally on the front edge of the terrain 6 is thus shadowed by the group of trees 16 located between them from the sensor 3 arranged in the left-hand rear corner. In the same way, the sensor 3" arranged in the centre is screened from the master module 5 by the rocky hill 19 in between them. For this reason, these sensors 3', 3" have no communication link 20.

In order to apply the respective position of the deployed sensors 3, an unmanned flying drone 23 overflies the terrain 6 at low altitude. The drone 23 has a radio-compatible programming means 25 and, as the position-finding means, a GPS detector 26. The programming means 25 and the position-finding means together form the programming module. As it overflies the terrain 6, the drone 23 identifies the individual deployed sensor 3' on the basis of the respective communication means, by the radio-compatible programming means 25. When the drone 23 has identified a sensor 3' on the terrain 6, then it uses the GPS detector 26 to determine its own global position, and transmits this to the identified sensor 3', where it is applied. In order to determine the global position, the GPS detector 26 communicates with a satellite 27 in a known manner.

The sensor network 1 which is formed once the individual communication links 20 have been set up communicates with a central control unit 29 which, in the illustrated example, is located on board the helicopter 8, by means of the master module 5. For this purpose, although this is not illustrated, the master module 5 has a radio communication means for setting up a long-range radio link. This allows the information from the sensor network 1 to be received not only by means of a helicopter 8 flying over it but also by a base station a long distance away. The communication of the master module 5, which acts as an interface between the sensor network 1 and the central control unit 29, is indicated schematically by waves 28.

If, by way of example, the drone 23 fails by being shot down, then a number of reference sensors 3" are deployed in the terrain 6, which have their own GPS detector 32. Furthermore and in addition, the master module 5 has a triangulation appliance 30. The position of the other surrounding sensors 3, 3' can be determined by field strength measurements by means of the deployed reference sensors 3', 3", which form a reference position. This refinement makes it possible to use the sensor network 1 to ensure the monitoring of the terrain 6 even when the actual programming module 25 which in the present case is provided in the drone 23 fails. Once the master module 5 has determined the position of the individual sensors 3, 3' by triangulation by means of the reference sensors 3", the respective positions can be applied to the sensors 3', 3" either by means of the master module 5 or by means of the overflying central control unit 29.

Once the sensor network 1 has been established, then the movement of a person 36 entering the area can be tracked by means of infrared radiation 34 by motion detectors which are arranged on the individual sensors 3, 3', 3". Since the precise position of each sensor 3, 3', 3" is known, this makes it possible to track the person 36 within the terrain 6 that he has entered. In a corresponding manner, it is possible to take countermeasures, for example by apprehension of the person 36.

Apart from this and in addition to motion detectors, the deployed sensors 3, 3', 3" contain further detectors for detection of vibration, by means of which it is possible to identify vehicles entering the area, as well as detectors for detection of biological warfare agents. Biochips, in particular, may be used for this purpose.

REFERENCE SYMBOLS

1 Sensor network
3,3'Sensors
3"Reference sensor
5 Master module
6 Terrain
8 Helicopter
10 Sensor (ejected)
13 Anchor
15 Track
16 Group of trees
17 Grass growth
18 Tree
19 Rocky hill
20 Communication link
23 Drone
25 Programming means
26 GPS detector
27 Satellite
28 Waves
29 Central control unit

30 Triangulation appliance
32 GPS detector
34 Infrared radiation
36 Person

What is claimed is:

1. A sensor network (1) having a plurality of fixed-position sensors (3, 3', 3"), which is deployable in a terrain (6), for monitoring-relevant parameters, having at least one programming module, said mobile programming module being a component of a self-navigating drone (23), said fixed-position sensors (3, 3', 3") each being equipped with a communication means for communication with one another and with the at least one programming module, said at least one programming module having a position-finding means and a programming means (25), facilitating the position of the sensors (3, 3', 3") to be determined by the position-finding means, and in each case being applicable to the sensors (3, 3', 3") by the programming means (25) via the communication means, and said sensors (3, 3', 3") being configured to form a network.

2. A sensor network (1) according to claim 1, wherein the position-finding means is a navigation element.

3. A sensor network (1) according to claim 2, wherein said navigation element is selectively a GPS or Galileo detector (26, 32).

4. A sensor network (1) according to claim 1, wherein the position-finding means comprises a triangulation appliance (30), and at least some of the sensors (3, 3', 3") comprise reference sensors (3") for fixing a position.

5. A sensor network (1) according to claim 4, wherein the reference sensors (3") include a navigation element.

6. A sensor network (1) according to claim 5, wherein said navigation element is selectively a GPS or Galileo detector (26, 32).

7. A sensor network (1) according to claim 1, wherein at least one master module (5), which is equipped with a communication unit, and wherein said master module comprises an interface between the sensors (3, 3', 3") and an external central control unit (29).

8. A sensor network (1) according to claim 1, wherein the sensors (3, 3', 3") include a communication detector for determination of a parameter which represents the communication strength.

9. A sensor network (1) according to claim 1, wherein the communication comprise transmitting and receiving units which selectively communicate optically or by radio.

10. A sensor network (1) according to claim 1, wherein the sensors (3, 3', 3") are ejectable from said self-navigating drone.

11. A sensor network (1) according to claim 1, wherein the sensors (3, 3', 3") are anchorable in a fixed position.

12. A method for monitoring a terrain (6), wherein a plurality of sensors (3, 3', 3") are deployed in fixed positions in the terrain (6) and including at least one mobile programming module, said sensors (3, 3', 3") forming a sensor network (1) through communication with the at least one programming module determining the position of the sensors (3, 3') and applying this to the sensors, the sensor network (1) monitoring parameters which are relevant for monitoring and associated with a local position through the sensors (3, 3', 3").

13. A method according to claim 12, wherein the at least one mobile programming module is a component of a self-navigating drone and navigates autonomously with respect to the sensors (3, 3', 3") and in the process determines and applies their position.

14. A method according to claim 13, wherein the sensors (3, 3', 3") are ejectable from said self-navigating drone.

15. A method according to claim 12, wherein the position-finding means determines its respective position and/or the position of the sensors (3, 3', 3") by a navigation element, such as selectively a GPS or Galileo detector (26, 32).

16. A method according to claim 12, wherein the position-finding means determines the position of the sensors (3, 3', 3") by triangulation on the basis of reference sensors (3").

17. A method according to claim 16, wherein the reference sensors (3") determine their position through a navigation element, in particular by selectively a GPS or Galileo detector (26, 32).

18. A method according to claim 12, wherein in addition to the sensors (3, 3', 3"), there is provided at least one master module (5) via which the sensors (3, 3', 3") communicate with an external central control unit (29).

19. A method according to claim 12, wherein the sensors (3, 3', 3") detect parameters which represent a communication strength, and are networked on the basis of the detected parameters.

20. A method according to claim 12, wherein the communication is implemented selectively by radio or through optical signals.

21. A method according to claim 12, wherein the sensors (3, 3', 3") are anchorable in the terrain (6) after deployment.

* * * * *